United States Patent [19]

Englert

[11] Patent Number: 5,116,489
[45] Date of Patent: May 26, 1992

[54] REEF BIOLOGICAL FILTRATION DEVICE

[75] Inventor: Frank Englert, Clifton Park, N.Y.

[73] Assignee: Village Wholesale, Inc., Latham, N.Y.

[21] Appl. No.: 640,974

[22] Filed: Jan. 14, 1991

[51] Int. Cl.$^5$ .................. B01D 35/00; A01K 63/04
[52] U.S. Cl. ................... 210/150; 210/169; 210/416.2; 210/456; 261/122; 261/123; 119/5
[58] Field of Search ............ 210/169, 416.2, 150, 210/151, 456; 119/5; 261/122, 123

[56] References Cited

U.S. PATENT DOCUMENTS

| | | | |
|---|---|---|---|
| 3,796,414 | 3/1974 | Winton | 210/169 |
| 3,891,555 | 6/1975 | Bennett et al. | 210/169 |
| 3,933,629 | 1/1976 | Smith | 210/150 |
| 4,076,619 | 2/1978 | Howery | 210/169 |
| 4,265,751 | 5/1981 | Willinger | 210/169 |
| 4,396,507 | 8/1983 | Grant | 210/150 |
| 4,427,548 | 1/1984 | Quick, Jr. | 210/150 |
| 4,692,314 | 9/1987 | Etani . | |
| 4,749,493 | 6/1988 | Hicks | 210/150 |
| 4,775,485 | 10/1988 | Etani . | |
| 4,853,131 | 8/1989 | Etani . | |
| 4,888,118 | 12/1989 | Barnes et al. . | |
| 4,894,149 | 1/1990 | Block . | |

OTHER PUBLICATIONS

Martin Moe, Jr., The Marine Aquarium Reference, copyright 1989, pp. 196–199.

Primary Examiner—Peter Hruskoci
Assistant Examiner—Robert James Popovics
Attorney, Agent, or Firm—Wall and Roehrig

[57] ABSTRACT

A reef type filtration device is provided in the form of a cylindrical chamber containing a series of bio-balls stacked from top to bottom, has input and output nipples in the top and bottom which can be simply and easily connected into the return line of the standard circulating pump for an aquarium. The addition, an air nozzle in the bottom end cap provides additional oxygen when connected to a standard air pump present in most aquarium installations. The bio balls provide a greatly increased surface area for growth of aerobic bacteria for removing ammonia and other nitrogenous compounds and the air introduces additional oxygen to maximize the growth of the ammonia consuming aerobic bacteria on this greatly increasing surface area.

3 Claims, 2 Drawing Sheets

REEF BIOLOGICAL FILTRATION DEVICE

BACKGROUND OF THE INVENTION

This invention relates to a filtration device, and more particularly to a reef type filtration device for maintaining the quality of water in an aquarium.

There has been an increasing interest in the cultivation and raising of fish by hobbyists for their beauty and observation pleasure. In raising fish for their aesthetic value of viewing of the fish in a closed tank, the water must be recirculated and purified not only to keep the fish alive, but to provide a clear visually attractive medium in which to view the fish. In closed or semi-open systems, it is necessary to filter the water both for physical filtration to remove solid matter from the water, as well as to treat the water to remove dissolved chemical contaminants from the water. The waste products of fish ultimately generate ammonia which is highly toxic to fish and other aquatic animals. In a closed or semi-open system, it is therefore necessary to provide means for removing ammonia and other nitrogenous wastes from the water. Generally, this involves cultivating aerobic bacteria colonies which utilize nitrogenous waste in their nutritional cycle and convert these wastes to less toxic compounds and exposing the bacteria to the aquarium water to remove the ammonia. While creation of these bacterial colonies has been efficiently accomplished for some fish tank filtration systems, the cost of most of these systems and the filter media used still is a significant cost for the home aquarium hobbyist.

For healthy growth of aquatic aerobic bacteria colonies a number of conditions must be met. First, an adequate oxygen supply must be present in the water since these bacteria are aerobic and thus dependent upon oxygen. Second, the flow rate of water must be maintained and controlled since stagnation of water in the filter medium will result in oxygen depletion and killing of the bacteria. Not only will the aerobic bacteria starve, but anaerobic bacteria will be encouraged, which are hazardous to the health of the fish. Thirdly, another problem faced in any filtration device is that of channeling of the water through the filter media, which again limits the effectiveness of the filter and tends to greatly decrease the filter surface area and the growth of the aerobic bacteria needed. Another factor is the need for a large surface area media on which the aerobic bacteria can grow. Generally speaking, the greater the surface area exposed to adequate flow rates and levels of oxygen, the greater the number of aerobic bacteria colonies that can be maintained in a given volume. This concept can be carried to the extreme of using the large surface area of sand or some such finely divided media for the growth of the bacteria, but then flow becomes very important and extremely difficult to maintain in a uniform and efficient fashion. Accordingly, most small aquariums have developed filtration systems using a plastic material media having large numbers of small rods or other surface forming elements upon which the aerobic bacteria can grow, and through which sufficient flow of water and oxygen can be provided.

Another problem that has affected the hobbyist industry, even in the improved filtration devices using a high surface area plastic media, is that of cleaning the device. Unfortunately, when the filter media are back-flushed or otherwise cleaned, most of the bacteria colonies are destroyed, along with the cleaning of the filter. It thus takes a significant amount of time for the colonies to be regrown before they can continue to do the necessary purifying and filtering of the water from the aquarium. With larger, more expensive filter units common in the hobby industry, the only recourse for the home hobbyist is to periodically clean and then to suffer the consequences for the next few days.

OBJECTS AND SUMMARY OF THE INVENTION

It is therefore an object of the present invention to provide a reef type filter for aquariums and the like which overcome the limitations of the prior art.

It is another object of the present invention to provide a simple and economical reef-type filtration device for aquariums that provides a large surface area for aerobic bacterial growth in a convenient economical package.

It is a further object of the present invention to provide a simple and effective filtration device for the growth of aerobic bacteria in which air is efficiently mixed with the water flow to maximize the aerobic bacterial growth.

It is another object of the present invention to provide a reef chamber filter for maximizing surface area and aerobic bacteria growth per cubic volume of the device to greatly increase the cost effectiveness of a reef-type filtration device.

It is a still further object of the present invention to provide an aerobic bacteria filtration device that can be easily and simply maintained in efficient operating condition.

These and other and further objects are accomplished in one embodiment of the present invention by providing a cylindrical clear plastic tube having a series of bio-ball filter media elements, stacked one on top of the other within the cylinder and having the cylinder disposed vertically alongside the tank and interposed in the normal water recirculation system of the tank. Additional efficiency is obtained by providing an air inlet at the bottom of the filter and a dispersion disk for thoroughly mixing the air and the water flow throughout the cylinder cross section as it is flowed upwardly through the bio-media and back to the tank. Brief Description of the Drawing Further objects of the invention, together with additional features and advantages accruing therefrom will be apparent from the following description of a preferred embodiment, which is shown in the accompanying drawings, wherein:

DETAILED DESCRIPTION OF THE PREFERRED EMBODIMENT

Figure 1:
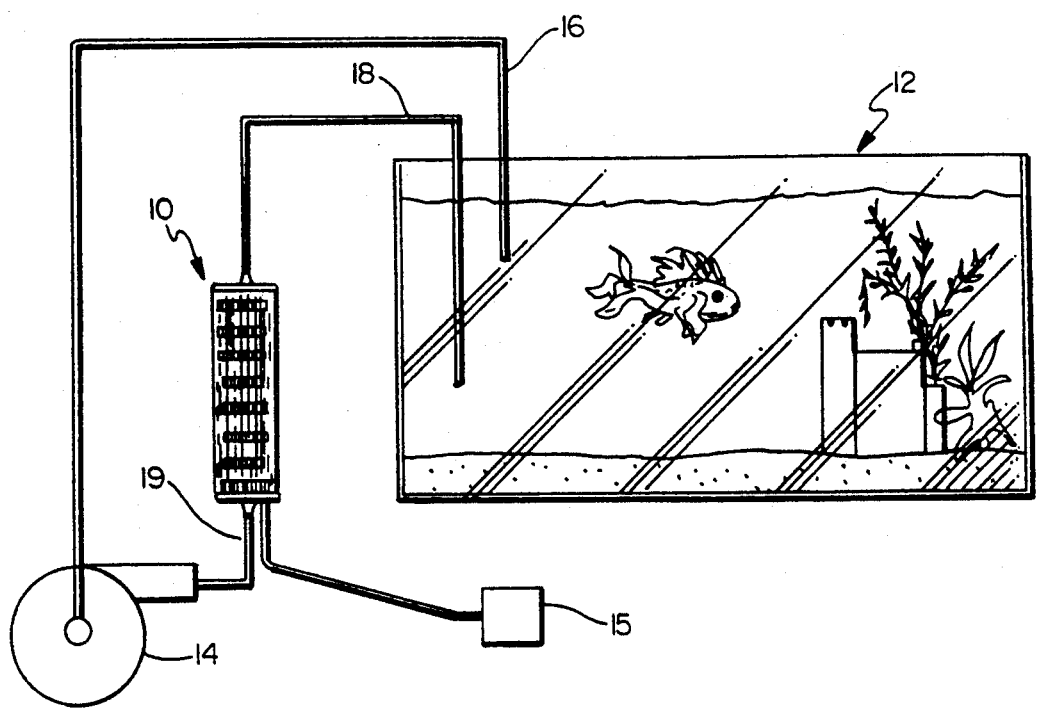
FIG. 1 is a block diagram of a typical aquarium tank and water recirculating system with the reef filter of the present invention connected in the loop.

Referring now to FIG. 1, there is shown a filtration device 10 according to the present invention connected into the recirculation system for an aquarium 12 which includes a pump 14, and input and output hoses 16 and 18 connected to the tank. As may be seen in the diagram of FIG. 1, the discharge of the recirculation pump 14 is directed to the bottom of the reef chamber 10 and the top of the chamber is then connected back into the tank. Water is withdrawn through the tube 16 by the pump 14 and then returned through the pipe 18. As can be seen, the reef chamber 10 can be easily and simply inserted in the return line to the aquarium 12.

Figure 2:
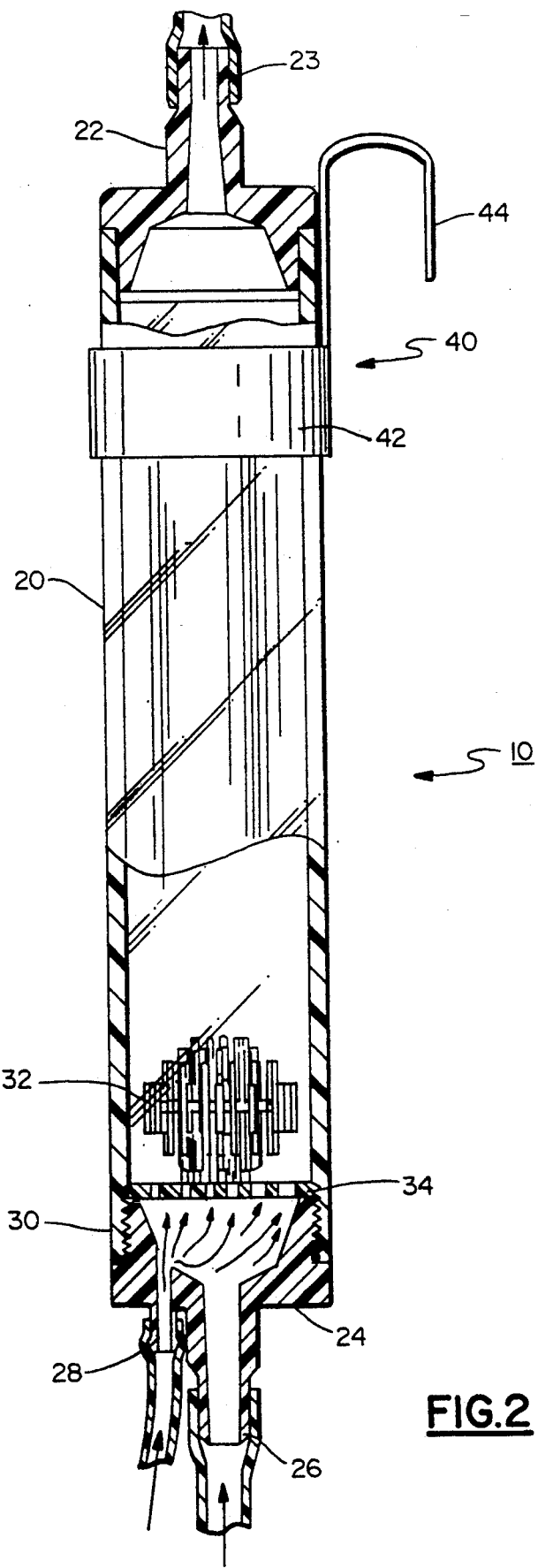
FIG. 2 is a cross-sectional view of the filtration device of the present invention.

Referring now to FIG. 2, the reef chamber filtration device 10 comprises generally a plastic tube 20 which is a generally cylindrical tube of 1½ to 2 inches in diameter and which may have any desired length of ten to fifteen inches convenient for installation on the side of a fish aquarium tank. The tube 20 has fixed to the top thereof output nipple 22 which is an integrally tapered cap for directing the water from within the chamber back into cap tube 18 which is slipped over the end of the nipple 23 in the well known manner. At the input end a cap 24 is provided which includes not only the input nipple 26 which receives the plastic tube 19 from pump 14, but also an air inlet nipple 28 which is connected to the pump 15 of FIG. 1 for introduction of air, as will be described in detail herein. The end cap 24 is removably affixed to the tube 20 as by threads, as shown at 30 so that the cap 24 can be removed for insertion and removal of the media elements 32 within the tube 20.

Figure 3:
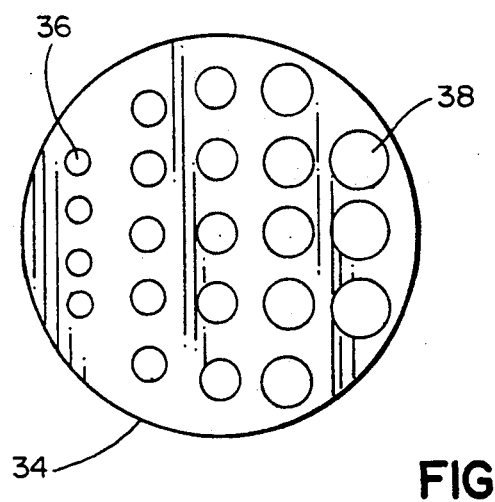
FIG. 3 is a plan view of the dispersion disc of the present invention.

A disc 34 is provided in the entrance to the tube at the end of the cap 24 by mounting on a shoulder. Disc 34 has a series of holes of varying sizes, shown at 36 and 38 in FIG. 3 which serve to direct the water and the air from the interior of the cap 24 in a uniformly distributed and mixed fashion throughout the entire interior of the tube 20, about the media 32 disposed axially therein.

The disc 34 has holes 36, 38 of varying diameter disposed about the surface thereof so that the air introduced through the nozzle 28 is properly dispersed for uniform passage through the length of the chamber 20. The aggregate cross sectional area of the holes on the right side of the disc 34, (FIG. 3) being substantially greater than the cross sectional area of the holes on the left side, causes this uniform mixing of air and water flow throughout tube 20. If the holes were all the same size, the velocity of the air entering at 28 would tend to push more air through the left-hand side of the column shown in FIG. 2 then the right hand and thus tend to overdevelop aerobic bacteria on that side and perhaps starve the aerobic bacteria on the right hand side of the tube and thus decrease the efficiency of the filtration device. Various discs can be used with different sets of holes for different size units, depending on the size of the air pump vs. the water pump, as is well known in the art. In order to obtain the maximum utilization of the media elements 32, they are stacked one on top of the other in axially alignment. In one configuration at least, they interlock and snap together to form a column of media that can be inserted within the tube 20 to form a vertical surface area extending from one end to the other of the tube 20 upon which aerobic bacteria can grow and act to remove from the circulated water the undesired ammonia and nitrogenous compound created by the fish in the aquarium.

Thus, in operation in a typical home aquarium situation, the return line from the water pump 14 to the tank 12 is broken and the reef chamber 10 inserted therein with the dual nozzle end cap 24 being positioned at the bottom of the reef chamber 10. As is shown in FIG. 2, end clip 40 can be placed about the cylinder 20 so as to provide a hook for hanging the reef chamber on the outside of the tank at the upper edge of the tank. This can be formed of a simple plastic spring clip portion 42 which, together with the U 44 affixed thereto, comprise the mounting clip 40 for the foregoing purpose.

After the reef chamber 10 is connected in series with the discharge of the water circulating pump 14, an air pump 15 is usually connected to the nozzle 28 and the air flow adjusted to match the water flow so that a uniform mixture of air and water is discharged through the disc 34 to provide the proper amount of air and water throughout the entire cross-sectional area of the tube 20 as it is pumped upwardly past the media 32 and out the discharge nozzle 23 of cap 22. In this manner, the contaminated water from the tank is mixed with air and fed to the aerobic bacteria that are growing on the media 32 for the removal of the ammonia and the other nitrogenous compounds. This introduction of the proper amount of air, along with the water, increases the normal aerobic bacterial growth and colonies in the chamber by some 25 to 30% over that of a chamber without the additional oxygen content.

According to the present invention, an economical, small, compact filtration device is provided which can be simply and easily inserted in the standard aquarium water circulating system of the average home hobby tank to provide aerobic bacterial filtering. The problem of cleaning has been overcome by providing a simple and economical unit in which it is a simple matter to merely remove the bottom three or four bio-balls that are most severely contaminated, and which are the balls adjacent the input to the device, and to lower the other bio-balls into that position and replace the upper ones with fresh ones, all of which can be done in a matter of a minute or so, leaving a healthy colony of aerobic bacteria in place to continue growing and to foster re-establishment of bacterial colonies on the new bio-balls inserted to replace the ones that are to be cleaned.

I have thus provided a small compact reef chamber which has a very large surface area for growth of aerobic bacteria and which has, through the introduction of additional oxygen, an even greater effective filtering capacity for removal of the unwanted ammonia and other nitrogenous compounds created by the fish in the aquarium. I have thus provided a very simple, economical and safe way to maintain a clear, attractive and healthful aquarium tank.

While this invention has been explained with reference to the structure disclosed herein, it is not confined to the details as set forth and this application is intended to cover any modifications and changes as may come within the scope of the following claims.

What is claimed is:

1. A reef filtration device for promoting healthy growth of aerobic bacteria colonies to remove unwanted ammonia in aquarium water which comprises:
   a tube member constructed and arranged to be mounted adjacent an aquarium and contain a plurality of media elements;
   an output cap having a water output nipple fixed on one end of said tube member;
   an input cap having at least two inlet nipples positioned on the other end of said tube member;
   one of said inlet nipples formed in the input cap positioned on the other end of said tube member being an air input nipple and one being a water input nipple;
   a plurality of large surface area media elements stacked one against another within said tube;
   a perforated disk mounted in the input cap of said tube member; and said perforated disk having a plurality of holes drilled in the flat surface thereof with the cross sectional area of the holes in one half of the disk being greater than the cross sectional area in the other half;

so that air and water to be filtered, are mixed together at the input end of the tube member and flowed over the media elements to promote the even growth of ammonia consuming aerobic bacteria.

2. The filtration device according to claim 1 wherein said perforated disk has a plurality of holes of varying diameters drilled therein to distribute mixed air and water uniformly about said media elements.

3. A filtration system for home type fish aquariums which comprises:

- a cylindrical plastic tube constructed and arranged to be mounted vertically along one side of an aquarium;
- input and output caps mounted on the ends of said tube having nipples for connection to air and water carrying tubing;
- a circular disc having a plurality of holes of varying diameters drilled therein positioned in the input cap to said tube;
- a plurality of large surface area plastic media elements stacked one on top of the other within said tube on said disc;
- water pump means for circulating water from a fish tank through said tube;
- air pump means connected to the input cap for introducing air into the water being circulated through said tube;
- hose means connecting the air and water pump means, the fish tank and the cylindrical tube in operative relationship.

* * * * *